3,015,461
HIGH-PERFORMANCE AIRCRAFT
Solomon S. Fineblum, Columbus, Ohio, assignor to North American Aviation, Inc.
Filed Mar. 7, 1958, Ser. No. 719,833
5 Claims. (Cl. 244—117)

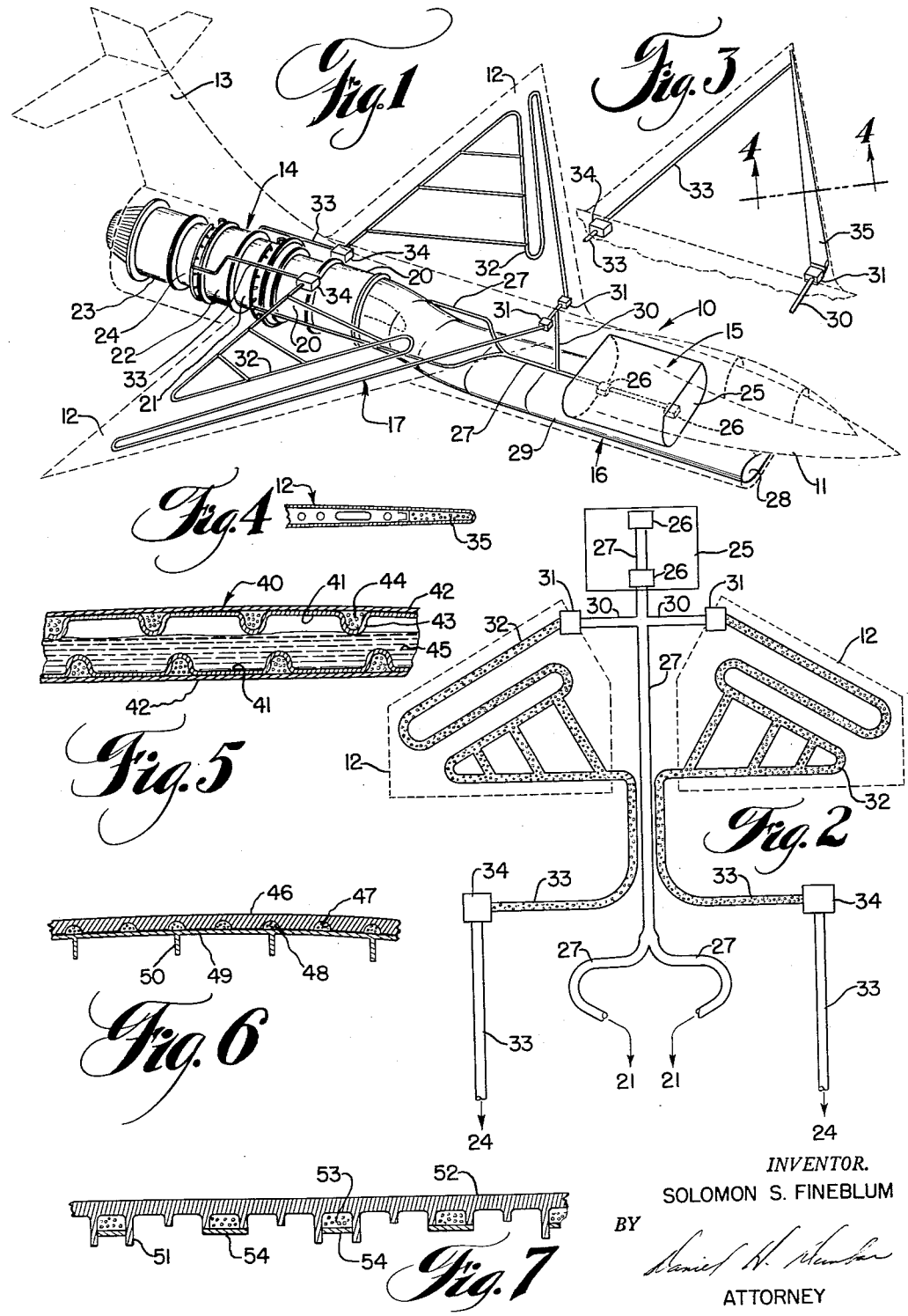

This invention relates generally to aircraft, and is particularly concerned with an airplane having improved high-performance characteristics.

Modern military aircraft and the like are typically provided with thrust augmentation arrangements which are intended for use during periods of high-performance operation. During periods of high-performance operation wherein thrust augmentation is utilized, supersonic velocities may be attained and it may be typically required that exterior surface portions of the airplane be cooled. Also, it is generally required that fuels utilized in the thrust augmentation devices be properly conditioned. The invention disclosed and claimed herein is intended to provide an effective arrangement for simultaneously cooling surface portions of an airplane and for conditioning fuel properly for use during utilization of a supplemental power scheme.

Accordingly, it is an object of this invention to provide a novel means for preheating and pressurizing fuel used in an aircraft thrust augmentation arrangement.

Another object of this invention is to provide means which may be utilized to effect cooling of aircraft surface portions throughout essentially high-performance operations.

Another object of this invention is to provide aircraft means which relates a fuel conditioning operation to aircraft surface cooling requirements throughout those periods wherein thrust augmentation is utilized.

Another object of this invention is to provide an aircraft thrust augmentation arrangement wherein the available refrigeration is approximately proportional to the rate of supersonic heating and to the required cooling effect.

Another object of my invention is to provide an aircraft surface cooling system for use during periods of thrust augmentation operation wherein the coolant temperatures employed are compatible with fuel stability.

Another object of this invention is to provide a thrust augmentation arrangement for aircraft which permits use of relatively inexpensive, low-temperature metals in the construction of exterior surfaces and surface structural members.

A still further object of this invention is to provide means for improving the effectiveness of thrust augmentation arrangements as utilized in high-performance aircraft.

Another object of this invention is to provide comparatively compact and light weight means which may be utilized in connection with high-performance aircraft thrust augmentation.

Another object of this invention is to provide an improved aircraft thrust augmentation arrangement which is comparatively simple to fabricate, which may be readily maintained, and which has a high degree of operational reliability.

Other objects and advantages of my invention will become apparent during consideration of the detailed description and drawings.

In the drawings, wherein like reference numerals are used to reference like components throughout the same:

FIG. 1 is a perspective view of a preferred embodiment of the thrust augmentation arrangement of this invention, showing its relation to a typical high-performance airplane;

FIG. 2 is a schematic diagram of portions of the thrust augmentation arrangement utilized in FIG. 1;

FIG. 3 is a perspective view of an alternate embodiment of a portion of the thrust augmentation arrangement of this invention;

FIG. 4 is a sectional view taken along the line 4—4 of FIG. 3; and

FIGS. 5 through 7 are sectional illustrations of typical heat transfer sections which may be utilized in the practice of this invention.

A preferred embodiment of the thrust augmentation arrangement of this invention is illustrated perspectively in FIG. 1, and is shown in its proper relation to the typical high-performance airplane 10 outlined by phantom lines. Airplane 10 is comprised essentially of fuselage 11, wings 12, and an empennage 13. Within various portions of the airplane 10 there is located a typical power plant system 14, a typical fuel supply system 15, a typical air supply system 16, and the thrust augmentation arrangement of this invention, which is designated generally by the numeral 17.

In the arrangement shown, the typical gas turbine power plant 14 is comprised of air compressor section 20, a burner section 21, a turbine section 22, and a thrust chamber 23. For purposes of thrust augmentation an afterburner section 24 is provided intermediate turbine section 22 and thrust chamber 23. It is recognized that separate or alternate forms of thrust augmentation might be provided in connection with high-performance aircraft. However, the afterburner section 24 of FIG. 1 is illustrated primarily as being exemplary of a state-of-the-art aircraft thrust augmentation component.

The fuel supply system 15 is basically comprised of one or more tanks 25 for the storage of fuel, pumps 26, and a supply line arrangement 27. During normal operations, fuel is drawn from tank 25 by pump 26 and supplied to burner section 21 of the aircraft engine 14 through the supply line arrangement 27.

Air is supplied to power plant 14 through the air supply system 16 which is contained generally interiorly of airplane 10. As shown in FIG. 1, air supply system 16 is comprised basically of an air inlet 28 and a duct 29. Means for controlling and varying the air intake quantity are generally well-known and accordingly are not illustrated in the drawings.

The systems heretofore described are typical and are generally used throughout normal operations. During such operations, air introduced into the system through inlet 28 and duct 29 is compressed in sections 20 of power plant 14, and is combined with fuel in the burner section 21. As previously indicated, the fuel injected into the engine at burner section 21 is supplied from fuel tank 25 through one or more pumps and the supply line arrangement 27. Combination of the fuel and air at burner section 21 results in combustion of the fuel and the resultant products of combustion are passed into turbine section 22. Partial expansion of the combustion products in turbine section 22 typically serves to drive compressor sections 20. The products of combustion are thereafter directed into thrust chamber 23. From thrust chamber 23 the products of combustion, still at comparatively high temperature and pressure levels, are directed rearwardly through an outlet opening to thus provide normal thrust for propelling the airplane 10.

During periods of intended high-performance operation, such as during attack mission high-speed run-ins, it is generally desired to provide airplane 10 with added thrust for comparatively short periods of time. The increased velocities may be within upper supersonic ranges and may thus result in increased heating of surface portions of the airplane. Also, it is required that the fuel injected into the thrust augmentation device 24 for thrust augmentation purposes be in a proper physical and temperature state at its injection point for maximum effectiveness. I have discovered an extremely effective arrangement whereby the fuel utilized for thrust augmentation purposes may be further utilized to provide a refrigeration effect for airplane surface areas, and whereby the heat generated by supersonic aircraft velocities is utilized to properly preheat and partially or completely vaporize the fuel preparatory to combustion in an aircraft thrust augmentation device.

The means for accomplishing this result is thrust augmentation system 17. This system is essentially comprised of a supply line 30 which is operatively connected either to fuel supply line arrangement 27 or to fuel tank 25, restrictor means 31, heat transfer section 32, a delivery line means 33, and pump 34 which is contained in delivery line 33. In FIGS. 1 and 2 the heat transfer section 32 is illustrated as including a continuous serpentine-like passageway located adjacent an upper surface of each wing member 12.

During the heretofore mentioned periods of high-performance operation wherein thrust augmentation is utilized, pump 34 is operated to draw fuel from the fuel supply system 15, to maintain a low-level internal pressure in heat transfer section 32, and to inject fuel into the thrust augmentation arrangement; e.g., afterburner section 24. Restrictor 31, which may take the form of a conventional expansion valve, an orifice, a capillary tube, or the like, functions to establish a pressure barrier in the passageway which connects supply line 30 to heat transfer section 32. Through a proper selection of pump 34, in combination with a proper restrictor 31 selection, a low internal pressure level may be maintained in heat transfer section 32. As fuel is passed from the comparatively high pressure region of supply line 30 and through the low pressure regions which are located interiorly of heat transfer section 32, substantial quantities of energy or heat will be required to preheat, partially or completely vaporize, and expand such fuel at the previously mentioned low-pressure level. Because passageway 32 is located adjacent an aircraft surface being heated by supersonic drag, heat may readily be drawn from the surface to effect such results. This phenomenon is made possible by wide temperature differences which may be created as between the aircraft surface temperature and the thrust augmentation fuel temperature.

By way of illustration, petroleum distillate fuels such as those carrying the military designation JP4, or the less volatile JP5, may be utilized in the practice of this invention; when so doing, ambient pressure levels of approximately 4.0 lbs./sq. in. absolute or less and approximately 0.5 lb./sq. in. absolute or less, respectively, are preferably maintained in heat transfer section 32 and the suction portion of delivery line 33. Commercially available pumps may be utilized to attain this result.

A portion of the heretofore described thrust augmentation system is illustrated schematically in FIG. 2.

Further modifications of this invention may include the arrangement of FIG. 3. In that illustration, the heat transfer section 32 is illustrated as a passageway 35 located adjacent the leading edge of a wing member. Other components of the system remain essentially in the form shown in FIG. 1.

FIGS. 5 through 7 illustrate, somewhat schematically, various schemes which might be utilized in locating a heat transfer section 32 within or adjacent an exterior surface portion of an airplane. In FIG. 5 a typical wing 40 is sectionally illustrated as having sheets 41 attached to the inner surface of skin components 42. Each sheet 41 is provided, in advance of assembly, with inter-connected offset portions 43. Offset portions 43 and portions of exterior skin member 42 function to define the vapor passageways 44. Basically, each assembly of sheet 41, skin 42, and passageways 44 comprise a heat transfer section 32. Fabrication techniques for effecting this assembly are well-known and typically utilize conventional welding methods and fastener means in combination with suitable sealants to readily achieve the desired end result. Also as shown in FIG. 5, the interior of wing 40 functions as a fuel storage member such as 25. In connection with this arrangement, fuel 45 may be drawn from the interior portion of wing 40, through a restrictor means such as 31, and then into the coolant passageways 44 prior to injection into the aircraft's thrust augmentation device during periods of high-performance operation.

In the arrangement of FIG. 6 there is shown an aircraft skin 46 having semi-circular grooves 47 milled therein. The heat transfer section vapor passageways 48 are defined by attaching plate 49 to the skin 46 in a proper sealed relation. Reinforcing ribs 50 may be provided on the underside of plate 49. In the FIG. 7 arrangement, integral reinforcing ribs 51 of skin component 52 function to define a portion of the passageways 53. Plates 54 may be welded or otherwise secured to rib members 51 in sealing relation to completely define coolant passageways 53.

Thus, it will be seen that by operation of pump means 34 during high velocity aircraft operations, an effective arrangement is provided for effecting the surface cooling required by supersonic surface heating conditions. Fuel pumped from the fuel supply system 15 into supply line 30 and through restrictor means 31 is first substantially reduced in pressure. As the low-pressure fuel is afterwards circulated through heat transfer section 32, a large temperature differential is established between such fuel and the aircraft exterior surface. This large temperature difference is conducive to the flow of heat from the aircraft surface to the fuel and fuel vapors contained in section 32. The increasing of fuel temperature as the liquid fuel and fuel vapors are circulated through heat transfer section 32 is desirable and adds to the effectiveness of the thrust augmentation arrangement. Suction pump 34 also functions to re-pressurize the low-pressure liquid and gaseous fuel conditioned in heat transfer section 32.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:
1. An airplane having: a power plant, a fuel-burning thrust augmentation component in said power plant, a fuel supply containing fuel for said thrust augmentation component, and a metallic fuel transfer means connected to said fuel supply and connected to said thrust augmentation component, said fuel transfer means having a heat exchanger section located in heat exchange relation to an exterior surface of said airplane, a flow restrictor means located intermediate said heat exchanger section and said fuel supply, and having fuel re-pressurization means located in said fuel transfer means intermediate said heat exchanger section and said thrust augmentation component, said flow restrictor means and fuel re-pressurization means substantially reducing the pressure of fuel transferred through said fuel transfer means.

2. The airplane defined in claim 1, wherein said fuel transfer means heat exchanger section is a plate-like member, said plate-like member having a passageway portion which conducts fuel and having a surface portion which constitutes an exterior surface of said air vehicle.

3. In combination with an airplane, a fuel supply containing fuel, a power plant having a first fuel-utilizing section and having a fuel-burning thrust augmentation component which comprises a second fuel-utilizing section, first fuel-conducting means connected to said fuel supply and connected to said first fuel-utilizing section, and second fuel-conducting means connected to said first fuel-conducting means and connected to said thrust augmentation component, said second fuel-conducting means having a pressure-reducing means, having a heat transfer section, and having a fuel re-pressurization means, said heat transfer section being contained in said second fuel-conducting means intermediate said pressure-reducing means and said fuel re-pressurization means and in heat exchange relation to an exterior surface of said airplane.

4. The airplane combination defined in claim 3, wherein said second fuel-conducting means heat transfer section is provided with an exterior surface area, said exterior surface area comprising an exterior surface area of said airplane.

5. The airplane defined in claim 3, wherein said pressure-reducing means and said fuel re-pressurization means are sized to reduce the pressure of fuel flowed through said heat transfer section to a low pressure value, said low pressure value being less than approximately 4.0 pounds per square inch absolute.

References Cited in the file of this patent

UNITED STATES PATENTS

| | | |
|---|---|---|
| 2,475,087 | Ensign et al. | July 5, 1949 |
| 2,655,786 | Carr | Oct. 20, 1953 |
| 2,681,778 | Hughes | June 22, 1954 |
| 2,745,249 | Sanborn | May 15, 1956 |
| 2,804,241 | McDowall et al. | Aug. 27, 1957 |
| 2,850,083 | Frost | Sept. 2, 1958 |
| 2,851,863 | Theed | Sept. 16, 1958 |
| 2,866,610 | Taylor | Dec. 30, 1958 |
| 2,943,828 | Van Driest | July 5, 1960 |